US008304051B2

(12) United States Patent
Town

(10) Patent No.: US 8,304,051 B2
(45) Date of Patent: Nov. 6, 2012

(54) DECORATIVE PANE

(76) Inventor: Jeremy Town, Kent (GB)

( * ) Notice: Subject to any disclaimer, the term of this patent is extended or adjusted under 35 U.S.C. 154(b) by 303 days.

(21) Appl. No.: 12/682,215

(22) PCT Filed: Oct. 8, 2008

(86) PCT No.: PCT/GB2008/050921

§ 371 (c)(1),
(2), (4) Date: Apr. 19, 2010

(87) PCT Pub. No.: WO2009/047559

PCT Pub. Date: Apr. 16, 2009

(65) Prior Publication Data

US 2010/0215893 A1 Aug. 26, 2010

(30) Foreign Application Priority Data

Oct. 8, 2007 (GB) .................................... 071957.7

(51) Int. Cl.
*B32B 3/30* (2006.01)

(52) U.S. Cl. .......................... 428/38; 428/99; 52/204.59

(58) Field of Classification Search .................... 428/38, 428/99, 119; 52/204.53, 204.59, 311.3; 206/477, 206/480, 483

See application file for complete search history.

(56) References Cited

U.S. PATENT DOCUMENTS

| | | | | |
|---|---|---|---|---|
| 3,460,303 | A | 8/1969 | Algrain et al. | |
| 3,655,493 | A | 4/1972 | Campbell | |
| 4,880,485 | A | 11/1989 | Lewis et al. | |
| 4,975,307 | A | 12/1990 | Sollogoub | |
| 5,056,656 | A | 10/1991 | Poll | |
| 5,137,761 | A | 8/1992 | Altmayer | |
| 5,418,021 | A | 5/1995 | Kim | |
| 6,138,433 | A | 10/2000 | Ridge | |
| 7,066,330 | B1 * | 6/2006 | Lashley | 206/480 |
| 2005/0028461 | A1 | 2/2005 | Czapka | |
| 2006/0272236 | A1 | 12/2006 | Williams et al. | |

FOREIGN PATENT DOCUMENTS

| | | |
|---|---|---|
| DE | 30 29 613 A | 3/1982 |
| EP | 1 760 245 A1 | 3/2007 |
| GB | 966339 | 8/1964 |
| GB | 1150796 | 4/1969 |
| GB | 2 313 144 | 11/1997 |
| GB | 2 338 681 A | 12/1999 |
| GB | 2 412 894 | 10/2005 |
| GB | 2 446 242 | 5/2009 |
| WO | WO 02/070284 A1 | 9/2002 |

OTHER PUBLICATIONS

PCT/GB2008/047559 International Search Report, and Written Opinion, Apr. 22, 2010.

PCT/GB2008/047559 International Preliminary Report on Patentability, mailed Apr. 22, 2010.

* cited by examiner

*Primary Examiner* — Alexander Thomas

(74) *Attorney, Agent, or Firm* — Fay Sharpe LLP

(57) ABSTRACT

A decorative pane is disclosed comprising two outer panes sandwiching a plastic supporting substrate to which at least one decorative element has been applied. Also disclosed is a decorative pane comprising a plastic supporting substrate to which at least one decorative element has been press-fit.

4 Claims, 1 Drawing Sheet

DECORATIVE PANE

This application is a National Filing under 35 U.S.C. 371 of PCT International Application No. PCT/GB2008/050921, International Filing Date Oct. 8, 2008, which claims the priority benefit of UK Application GB 0719597.7, filed Oct. 8, 2007.

FIELD OF INVENTION

This invention relates to a decorative pane.

BACKGROUND TO INVENTION

Traditionally, decorative glass panes comprise a mosaic of coloured glass pieces, individually shaped and held together by strips of lead and supported by a rigid frame.

More recently, such panes have been created by forming decorative elements on an underlying, supporting glass substrate. This would include the direct bonding of decorative elements to the substrate as well as the bonding of bevels on the substrate and the creation of decorative elements in the cavities defined by the bevels and the supporting substrate (e.g. by curing coloured liquid resin poured in to the cavities). It is also known to bond a decorative, unitary plastic moulding to a supporting glass substrate.

Such decorative panes can be doubled glazed by sandwiching decorative elements applied to one supporting glass substrate with another glass substrate.

SUMMARY OF INVENTION

In accordance with the present invention, there is provided a decorative pane comprising a planar, plastic supporting substrate from which moulded protrusions protrude from the plane of the substrate, and in to which at least one decorative element has been press-fit. Preferably, at least one decorative element has been press-fit in to each side of the plastic supporting substrate.

Ideally, such a decorative pane further comprises two outer panes sandwiching the plastic supporting substrate.

For the avoidance of doubt, "supporting" is intended to mean that the plastic supporting substrate has some degree of structural integrity sufficient to support the decorative elements at least to some extent independently of the outer panes. It is not intended to include, for example, a thin film that would have to be bonded to one of the outer panes to prevent distortion and/or sagging of the film under the weight of the decorative elements. Furthermore, it is not intended to exclude an arrangement where the outer panes are in contact with the supporting substrate and provide restraint in a direction perpendicular to plane of the panes.

The inventor has realised that such a decorative pane with its plastic supporting substrate has many benefits including: simplified manufacture compared to conventionally manufactured decorative panes; enabling decorative elements to be readily applied to either side of the plastic supporting substrate, facilitating a dual aspect decorative pane, i.e. where decorative elements are provided facing both outer panes; and requiring no adhesives as there is no requirement to bond the supporting substrate to either pane.

BRIEF DESCRIPTION OF DRAWINGS

The invention will now be described, by way of example only, with reference to the following figures in which.

DETAILED DESCRIPTION

Figure 1:
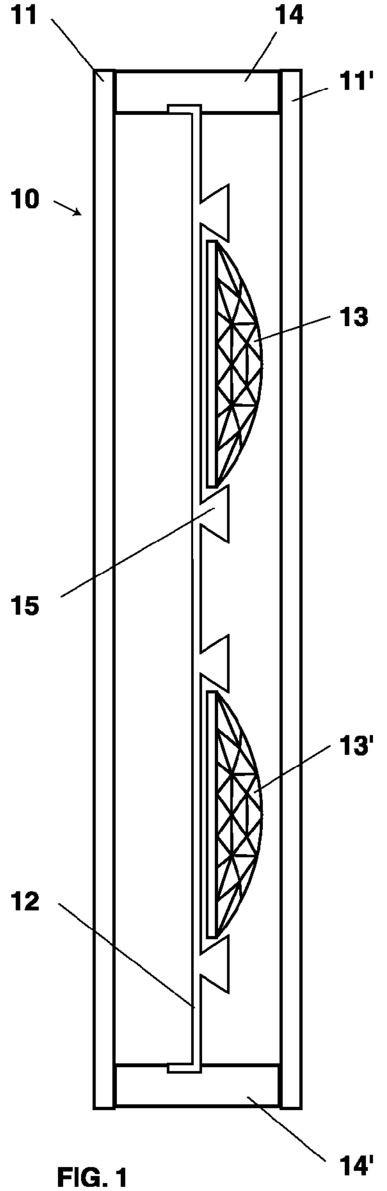
FIG. 1 shows, schematically, a section through a decorative, double glazed pane in accordance with the present invention.

Referring to FIG. 1, a section through a decorative, double glazed pane 10 is shown composed of two outer panes of glass 11, 11' sandwiching an internal moulded plastic substrate 12 with flexible protrusions 15 for retaining decorate elements 13, 13' using a press-fit. The plastic substrate would typically be a UV stable polyester or acrylic.

The panes 11, 11' and the plastic substrate 12 are joined at their respective peripheries by spacers 14, 14' whereby the panes and the plastic substrate are spaced apart.

Figure 2A:
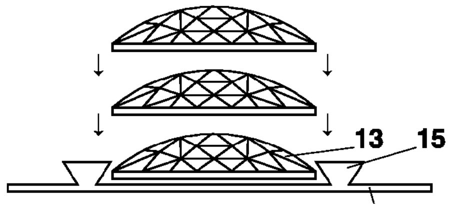
FIGS. 2*a* and 2*b* illustrating the press-fitting of a decorative element in to the plastic supporting substrate of the pane of FIG. 1.
Figure 2B:
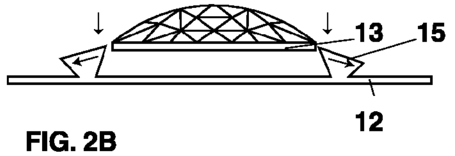

FIGS. 2*a* and 2*b* illustrate the press-fitting of a decorative element 13 in to the plastic supporting substrate 12. In particular, moulded protrusions 15 are shown deforming when receiving the decorative element.

Figure 3:
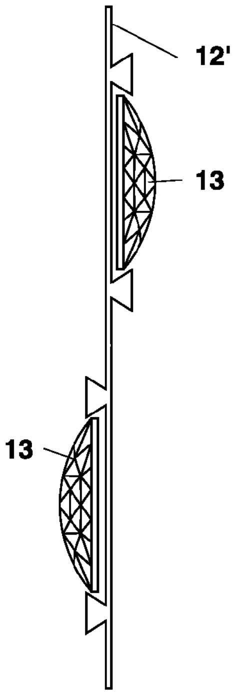
FIG. 3 shows, schematically, an alternative configuration of a the plastic supporting substrate and decorative elements according to the present invention.

FIG. 3 shows, schematically, an alternative plastic supporting substrate 12' whereby decorative elements 13, 13' are press-fit in to opposing sides of the supporting substrate, thereby facilitating a dual aspect decorative pane (not shown) incorporating the same.

Figure 4:
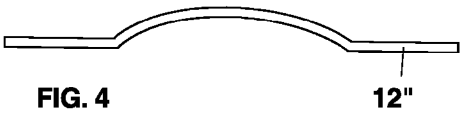
FIG. 4 shows, schematically, a further alternative configuration of a the plastic supporting substrate according to the present invention.

FIG. 4 shows, schematically, a feature of an alternative plastic supporting substrate 12" according to the present invention with a decorative element in the form of a concave recess. It would be inherently difficult to provide such a feature in a conventional film for bonding to a pane, however, with the structural integrity associated with plastic supporting substrates of the present invention, such a decorative element can be readily sandwiched between outer panes.

The supporting plastic substrate can be manufactured by conventional techniques including vacuum forming. One would expect a suitable thickness of plastic to be in the order of 2 to 4 mm so as to have sufficient rigidity to support decorative elements, but also sufficient flexibility to enable decorative elements to be press-fit in to place.

A preferred method of manufacturing is as follows. Step 1: to machine a mould for the supporting substrate from say an acrylic, i.e. a material generally unsuited to heat applied during vacuum forming but one which may be readily machined. Step 2: to form a negative mould (i.e. corresponding to the shape of the supporting substrate) using rubber. And step 3: to form a positive mould from a specialist casting compound, e.g. to create a silastic mould. This enables fine textures and detail to be rendered because of the workability of acrylic compared to say aluminium which might conventially be used to make a first mould of a product for which manufacture by vacuum forming is intended.

Alternatively, one might initially make a silastic mould and final tool from an original glass master. This is significant as it allows the replication of an existing glass styles. In particular, fused, kiln formed and slumped decorative glass could be replicated with great accuracy.

The decorative elements can be made from a range of materials that are currently not commonly used as decorative elements for such panes including plastic, onyx or marble. Colour can be added by floating liquid plastic dyes into cavities created during moulding of the plastic substrate. The plastic substrate may also have embossed textures formed as part of the moulding process where, for example, some obscuration of a pane is required.

The rigidity of the supporting substrate may be enhanced with deep grooves which may also have an aesthetic quality.

The present invention may be particularly useful for decorative mirrors as the supporting substrate need not be bonded to a mirrored surface.

From reading the present disclosure, other modifications will be apparent to persons skilled in the art. Such modifications may involve other features which are already known in the design and manufacture of plastic mouldings and decorative panes, and component parts thereof and which may be used instead of or in addition to features already described herein

The invention claimed is:

1. A decorative pane comprising a planar, plastic supporting substrate from which moulded protrusions protrude from the plane of the substrate, and in to which at least one decorative element has been press-fit, and two outer panes sandwiching the plastic supporting substrate.

2. A decorative pane as described in claim 1 wherein at least one decorative element has been press-fit in to each side of the plastic supporting substrate.

3. A double-glazed pane comprising:

a decorative pane comprising a planar, plastic support substrate having a plane surface with moulded protrusions thereon, and into which at least one decorative element has been press-fitted, and two outer panes sandwiching the plastic supporting substrate.

4. A double-glazed pane as claimed in claim 3 wherein at least one decorative element has been press fitted into each side of the plastic supporting substrate.

* * * * *